United States Patent [19]

Sajkowski et al.

[11] Patent Number: 5,200,060
[45] Date of Patent: Apr. 6, 1993

[54] HYDROTREATING PROCESS USING CARBIDES AND NITRIDES OF GROUP VIB METALS

[75] Inventors: Daniel J. Sajkowski, Winfield, Ill.; Shigeo T. Oyama, Potsdam, N.Y.

[73] Assignee: Amoco Corporation, Chicago, Ill.

[21] Appl. No.: 692,284

[22] Filed: Apr. 26, 1991

[51] Int. Cl.$^5$ ............................................. C10G 47/02
[52] U.S. Cl. ................................... 208/108; 208/110; 208/111; 208/112; 208/216 R; 208/217; 208/251 H; 208/254 H
[58] Field of Search ............... 208/108, 110, 111, 112, 208/216 R, 217, 254 H, 251 H

[56] References Cited

U.S. PATENT DOCUMENTS

| | | | |
|---|---|---|---|
| 4,325,842 | 4/1982 | Slaugh et al. | 502/177 |
| 4,325,843 | 4/1982 | Slaugh et al. | 502/177 |
| 4,515,763 | 5/1985 | Boudart et al. | 423/409 |

OTHER PUBLICATIONS

"Catalytic Behavior of Selected Transition-Metal Carbides, Nitrides, and Borides in the Hydrogenation of Quinoline", Schlatter et al, Ind. Eng. Chem. Res. 1988, vol. 27.

Advanced Materials in Catalysis, Burton et al, 1977, pp. 118-119.

Primary Examiner—Theodore Morris
Assistant Examiner—William C. Diemler
Attorney, Agent, or Firm—Thomas A. Yassen; Richard A. Kretchmer; Frank J. Sroka

[57] ABSTRACT

In a hydrotreating process, a hydrocarbon feedstock having a boiling of at least about 460° F. is contacted with a catalyst having at least one member selected from the group consisting of a carbide of a Group VIB metal and a nitride of a Group VIB metal under hydrotreating conditions.

27 Claims, 1 Drawing Sheet

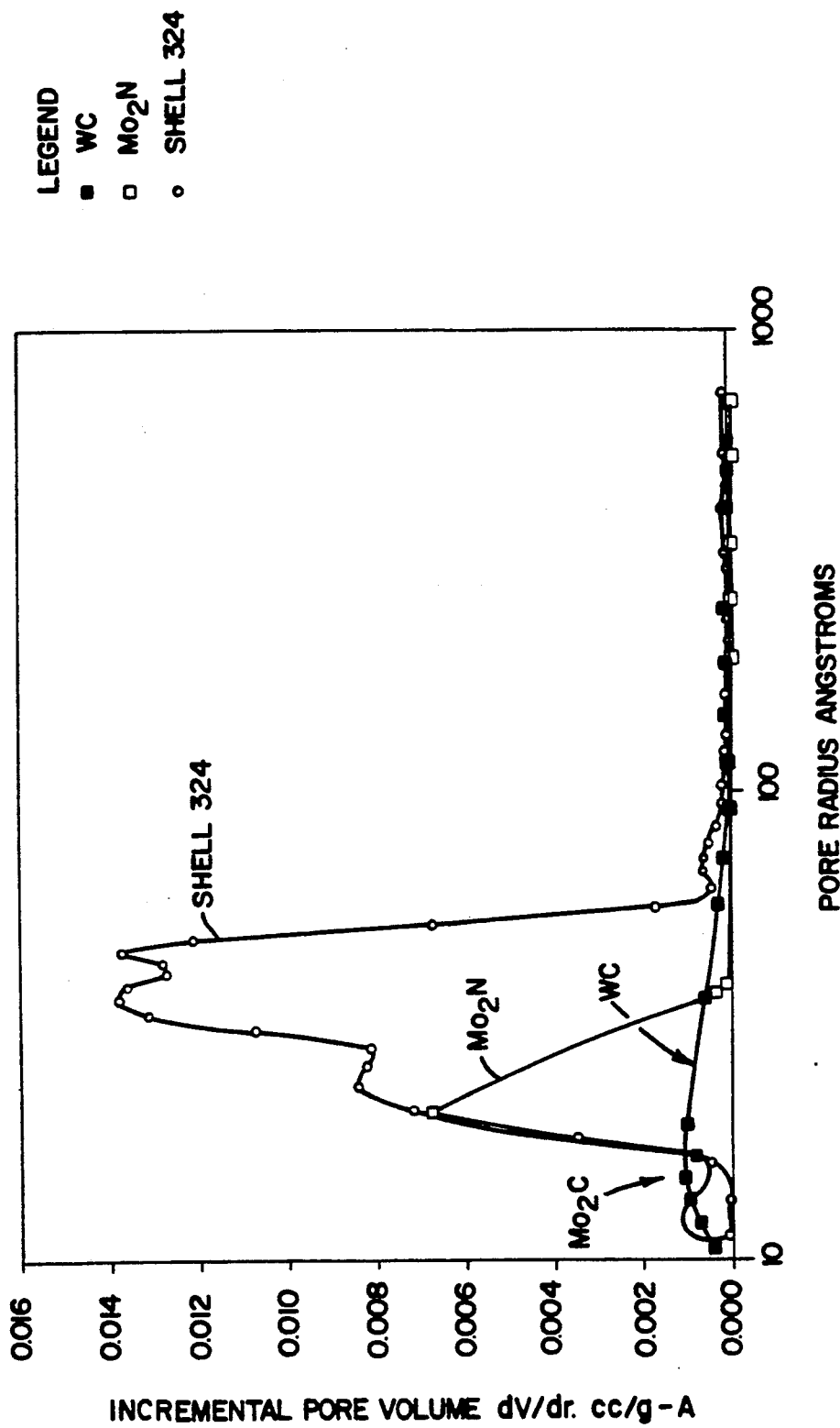

HYDROTREATING PROCESS USING CARBIDES AND NITRIDES OF GROUP VIB METALS

BACKGROUND

This invention relates to the catalytic hydrotreatment of coal-derived liquids and similar hydrocarbon materials. More particularly, this invention relates to the use of a catalyst comprising a carbide and nitride of a Group VIB metal in such hydrotreating processes.

In the petroleum refining industry, hydrotreating processes are in wide use. Typical applications range from mild hydrosweeting carried out at high space velocities, low pressures and temperatures, and minimal hydrogen consumption. The object of these processes is to remove sulfur, nitrogen, and other non-hydrocarbon components, as well as to improve odor, color, stability, and other important quality characteristics. A more severe hydrotreating process includes the saturation of aromatic compounds present within heavy oils. This is useful for producing clean-burning fuels, improving the octane of diesel fuels, and reducing the coking propensity of stocks fed to catalytic cracking units for further upgrading. The most severe hydrotreating processes are used to convert residual feedstocks with atmospheric boiling points exceeding 1,000° F. In each of these applications, the process is carried out in the presence of a catalyst.

Catalytic hydrotreating is not limited to feedstocks derived from petroleum. Because the catalytic chemistry of hydrotreating petroleum-derived hydrocarbons and hydrocarbons derived from oil shale, coal, and tar sands is similar, the same processes and catalysts are used to produce synthetic fuels. Indeed, many of the current petroleum processes and catalysts originated from research on coal liquefaction conducted in Germany in the 1930s and '40s. Coal liquefaction was used to supply fuels for the German war effort in World War II. The production of synthetic fuels remains topical today as a means to reduce United States's dependence on foreign crude oil.

Generally, catalysts employed for hydrotreating processes are comprised of composites of Group VIB or Group VIII metal hydrogenating components, or both, with an inorganic oxide base, or support, typically alumina. These catalysts typically are treated with sulfur-containing compounds to activate the Group VIB and Group VIII metals by converting them to their respective sulfides. While these catalysts have been effective there is a need for improvements. Recent concerns about the environment have necessitated a re-evaluation of all of the petroleum refining industry's hydrotreating processes. Furthermore, breakthroughs in hydrotreating catalyst technology would have a major impact on the economics of producing synthetic fuels.

A preferred alternative hydrotreating catalyst would contain metals from non-Group VIII because the latter are amongst the most expensive catalytic metals. Novel catalytic properties would then be imparted by the incorporation of inexpensive elements such as carbon and nitrogen. In the past, carbides and nitrides of Group VIB metals were not used as hydrotreating catalyst because of problems in synthesizing these catalyst with high surface areas. Recently, preparation techniques were developed to prepare high surface area carbides and nitrides of Group VIB metals. U.S. Pat. No. 4,515,763 discloses a method of preparing high surface area carbides and nitrides of Group VIB metals. In this patent, bulk carbides and nitrides of Group VIB metals having a surface area of up to 188 $m^2/g$ are disclosed. Other methods of preparing high surface area carbides and nitrides of Group VIB metals are disclosed in U.S. Pat. Nos. 4,325,842, 4,325,843, and Lee, J. S., Oyama, S. T., and Boudart M. "Molybdenum Carbide Catalyst", Journal of Catalysis 106, 125–133 (1987). None of these references disclose or suggest using these catalyst as a hydrotreating catalyst.

The use of carbides and nitrides of Group VIB metals as a hydrotreating catalyst for certain model feeds has been disclosed in the prior art. In the paper Schlatter, James C., Oyama, S. Ted, Metcalfe, III, Joseph E., and Lambert, Jr., Joseph M., "Catalytic Behavior of Selected Transition-Metal Carbides, Nitrides, and Borides in the Hydrodenitrogenation of Quinoline," Industrial Engineering Chemistry Research, Vol. 27, p. 1639 (1988), high surface area carbides and nitrides of Group VIB metals were synthesized and tested for hydrodenitrogenation activity with quinoline. The experiment reported on by the Schlatter paper was conducted at a pressure of only 1,000 psig. In addition, quinoline boils at 458° F. and contains only 17 atoms. The feedstock and hydrotreating conditions disclosed in the Schlatter paper were substantially different than typical commercial hydrotreating processes which can have a pressure of up to 2,000 psig and feedstocks containing materials boiling greater than 1,000° F. In Lee, J. S., Boudart, M., "Hydrodesulfurization of Thiophene Over Unsupported Molybdenum Carbide," Applied Catalysis Vol. 19 (1985) 207–210, high surface area unsupported molybdenum carbide was synthesized and tested for hydrosulfurization of thiophene. The experiment reported on by the Lee paper was conducted at a pressure of only 15 psig. Moreover, thiophene, which boils at 183° F. and contains only 9 atoms, has a high desulfurization rate in comparison with higher boiling sulfur compounds typically found in commercial hydrotreating feedstocks and, therefore, can be successfully desulfurized using catalyst and process conditions that would be ineffective for desulfurizing commercial hydrotreating feedstocks.

The size of the constituent molecules in commercial hydrotreating feedstocks is important. The molecules must be sufficiently small to enter the pores of the hydrotreating catalyst. While the pores of catalysts similar to the catalysts described in the Schlatter and Lee papers above are of sufficient size to admit small molecules, such as quinoline and thiophene, these catalysts are not expected to admit the much larger molecular constituents of commercial hydrotreating feedstocks.

It has been suggested that carbides and nitrides of Group VIB metals are not suitable for heavier hydrocarbon feedstock due to high sulfur content of such feedstocks. In the Schlatter paper, molybdenum carbide was tested with quinoline in the presence of sulfur. The results were a decrease in both hydrodenitrogenation activity and selectivity in comparison with a conventional Ni-Mo alumina catalyst. Further, in Burton, James J., Garten, Robert L., Advanced Materials in Catalysis, Academic Press, 101, (1977), it is disclosed that carbides of transition metals are unstable in high $H_2S$ concentrations, particularly the level of $H_2S$ typically found in coal liquids. Sulfur poisoning of carbide and nitride catalysts is even more likely to occur at commerial hydrotreating conditions because the high pressures lead to high partial pressures of $H_2S$.

There is a need for an improved hydrotreating process using carbides and nitrides of Group VIB metals. More specifically, there is a need for a process using carbides and nitrides of Group VIB metals for effective hydrotreating of heavier, high sulfur-containing hydrocarbon feedstocks at commercial conditions.

SUMMARY OF THE INVENTION

In its broadest aspect, the present invention is a hydrotreating process comprising contacting a hydrocarbon feedstock having a boiling point of at least about 460° F. with a catalyst having at least one member selected from the group consisting of a carbide of a Group VIB metal and a nitride of a Group VIB metal under hydrotreating conditions including a temperature of at least about 600° F. and a pressure of greater than about 1,000 psig. Applicants have discovered that carbides and nitrides of Group VIB metals are suitable for use in hydrotreating heavy feedstocks.

In another embodiment, the present invention is a hydrotreating process comprising contacting a hydrocarbon feedstock having a boiling point of at least about 650° F. and a sulfur content of at least about 1,000 ppm by weight with a catalyst having at least one member selected from the group consisting of a carbide of a Group VIB metal and a nitride of a Group VIB metal under hydrotreating conditions including a temperature of at least about 600° F. and a pressure of greater than about 1,000 psig. Applicants have discovered that carbides and nitrides of Group VIB metals are suitable for use in hydrotreating heavy, sulfur-containing hydrocarbon feedstocks.

In another embodiment, the present invention is a hydrotreating process comprising contacting a hydrocarbon feedstock having a boiling point of at least about 1,000° F. and a sulfur content of at least about 1% by weight at hydrotreating conditions including a temperature of at least about 600° F. and a pressure of greater than about 1,000 psig.

DESCRIPTION OF THE DRAWING

FIG. 1 is a plot comparing pore size distributions of catalysts employed in the process of the present invention with a prior art catalyst.

DESCRIPTION OF THE PREFERRED EMBODIMENT

The present invention is a hydrotreating process wherein a hydrocarbon feedstock having a boiling point of at least about 460° F. is contacted with a catalyst that comprises a carbide or nitride of a Group VIB metal under commercial hydrotreating conditions.

The catalyst of the present invention comprises a carbide or a nitride of a Group VIB metal. A Group VIB metal is defined as chromium (Cr), molybdenum (Mo), or tungsten (W). The preferred Group VIB metals are Mo and W. A suitable mole ratio of carbon or nitrogen to Group VIB metal can be from about 1:1 to 2:1. Preferred carbides are $Mo_2C$ and WC. A preferred nitride is $Mo_2N$. The concentration of the Mo component present in the catalyst composition of the process of the present invention can be about 3-94 wt %, calculated as Mo and based on the total weight of the catalyst composition. The concentration of the W component present in the catalyst composition employed in the method of the present invention is from about 3-94 wt %, calculated as W and based on the total weight of the catalyst composition.

The catalyst of the present invention can be supported or unsupported. In a preferred embodiment, the support comprises at least one porous refractory inorganic oxide. Examples of useful supports include, but are not limited to, alumina, silica, silica-alumina, stabilized alumina such as silica-stabilized alumina, phosphated alumina, stabilized phosphated alumina such as silica-stabilized phosphated alumina, fluorided alumina, alumina-aluminum phosphate, boria-alumina, boria magnesia, titania, zirconia, and the like. The amount of support material can be from about 6-97% based on the total weight of the catalyst composition.

The catalyst of the present invention can be tailored to a variety of physical properties depending upon the feedstock used and the type of hydrotreating process desired. In one embodiment the catalyst support has a bimodal distribution. As defined here, bimodal distribution means a pore distribution including two major peaks of pore diameters measured on a plot of pore volume in cc/gm versus pore diameter or radius. In this bimodal distribution, the smaller pores are defined as having peak concentrations below about 600 Angstroms in diameter, and the larger pores are defined as being above that value. The average diameter of the smaller pores range from about 100 to 200 Angstroms, preferably 100-150 Angstroms, and most preferably 120-140 Angstroms. The average diameter of the larger pores is in excess of 1,000 Angstroms and generally range from 12,000 to 10,000 Angstroms.

Bimodal supports have been found to be more active when hydrotreating coal gas oils and resids. It is believed that, although the smaller pores are more catalytically active, they are more subject to clogging during long-term use. The larger pores may not be catalytically active but provide access to the smaller pores. This accounts for the ability of the catalyst to convert the coal to a liquid product at high conversion efficiencies during longterm operation and to provide an ultimate coal liquid of low sulfur content and low viscosity.

In another embodiment, the pore structure of the catalyst of the present invention can have about 0-10% of its total pore volume in pores having diameters under 50 Angstroms, about 30-80% of its total pore volume in pores having diameters of about 50-100 Angstroms, about 10-50% of its total pore volume in pores having diameters of about 100-150 Angstroms, and about 0-20% of its total pore volume having diameters that are larger than 150 Angstroms. The average pore diameter is calculated by means of the expression:

$$A.P.D. = (4 \times P.V. \times 10^4)/S.A.$$

wherein A. P. D. is the average pore diameter and S. A. is the BET surface area. This method of determining average pore diameter is discussed by Ciapetta, F. C., and Henderson, D. S., in an article in *Oil & Gas Journal*, Vol. 65, p. 88 (1967).

Other catalyst physical properties important in the present invention are surface area and pore volume. In a preferred embodiment, the surface area of the catalyst employed in the process of the present invention is at least about 30 m2/gm. In one embodiment, the catalyst employed in the process of the present invention has a total pore volume of at least about 0.06 cc/gm.

A preferred method of preparing the catalyst employed in the present invention is disclosed in Oyama, S. T., Schlatter, J. C., Metcalfe, J. E., Lambert, J. M., *Ind. Eng. Chem. Res.* 27, 1639 (1988). This procedure consists of preparing a Group VIB metal oxide precursor, loading the metal oxide precursor into a reactor tube, establishing the reactant gas flows, and implementing a specific temperature program. This procedure is discussed in detail in the Example section of this application. A similar procedure is disclosed in Lee, J. S., Oyama, S. T., and Boudart, M., "Molybdenum Carbide Catalysts", *Journal of Catalysis*, 106, 124–133 (1987).

Another catalyst preparation method suitable for use in the present invention can be found in U.S. Pat. No. 4,325,842. The method consists of impregnating a porous, inert support with a solution of hexamolybdenum dodecachloride dissolved in an organic solvent, heating the impregnated support in a non-oxidizing atmosphere to remove the solvent, and subsequently heating to about 1,200°–1,382° F. in a carbiding gas mixture comprising hydrogen, lower alkane, alkene or carbon monoxide and as noble gas.

Another catalyst preparation method suitable for use in the present invention can be found in U.S. Pat. No. 4,325,843. The method consists of impregnating an oxide support material with a solution of a tungsten salt which is decomposable upon heating to the oxide, drying the impregnated support to remove the solvent, heating the resultant support in a non-reducing atmosphere at about 840°–1,292° F. to convert the tungsten salt to the oxide, heating the resultant support in ammonia at about 1,292°–1,472° F. to convert the tungsten oxide to the nitride and subsequently heating this material at about 1,292°–1,472° F. in a carbiding gas mixture comprising hydrogen and a lower alkene/alkane or carbon monoxide.

The catalyst employed in the present invention can itself be employed in a fixed- or expanded-bed process. In fixed-bed processes, hydrocarbon feed and a hydrocarbon-containing gas are passed downwardly through a packed bed of catalyst under hydrotreating conditions. Catalyst strength, size, and shape can be important in fixed-bed operations because of the significant pressure drop across a fixed bed. In a preferred embodiment, larger catalyst particles are employed at the top of the catalyst bed and smaller particles throughout the remainder of the catalyst bed in order to decrease the pressure drop. Catalysts in the form of spheres or extrudates, preferably about 0.01–0.1 inch in diameter give good results in terms of promoting adequate contact between catalyst and feed components while avoiding excessive pressure drop through a catalyst bed. More preferably, particles of about 1/32 to about 1/16 inch diameter are used. Trilobe, cloverleaf, cross, and "C"-shaped catalysts give particularly good results in terms of maximizing catalyst efficiency and promoting a high level of contact between catalyst and feed components.

In an expanded-bed process a packed catalyst bed is expanded and mobilized by upflow of hydrocarbon feed and hydrogen-containing gas at space velocities effective to provide adequate mobilization and expansion, and thereby promote contact between catalyst particles and reactants, without substantial carryover of catalyst particles. Preferred catalyst for expanded-bed use are extrudates of about 0.02–0.05 inch in diameter, with about 1/32 inch being most preferred. A preferred expanded-bed process, particularly for treatment of high metals or high sulfur feed, is an ebullated bed process. In such a process, the catalyst is preferably present in an amount sufficient to occupy at least about 10 volume % of the expanded bed and is continuously added to the reaction zone to compensate for continuous withdrawal of catalyst from the reactor. Specific details with respect to ebullated-bed processes are found in U.S. Pat. Nos. 3,188,286 and 2,987,465 which are incorporated herein by reference.

In regard to the hydrocarbon feedstock suitable for use in the present invention, an essential feature of the present invention is a hydrocarbon feedstock having a boiling point of at least about 460° F., preferably at least about 650° F., and most preferably at least about 1,000° F. The feedstock can be petroleum-based, coal-based, or tar sand-based. Accordingly, suitable feedstocks include, but are not limited to, petroleum gas oil and residua, atmospheric and vacuum resids, tar sand oils, tar sand resids, and coal gas oil and residua. The hydrocarbon feedstock of the present invention can contain a substantial amount of polycyclic aromatics. Substantial is defined as greater than about 75%, preferably greater than about 85%, most preferably greater than about 95%. In a preferred embodiment, the hydrocarbon feedstock has a sulfur content of at least about 250 ppm by weight, preferably at least about 1,000 ppm, most preferably at least about 1%. The sulfur content of the feedstock can vary depending upon the molecular weight and nature of the feed. Coal gas oils can have a sulfur content about 0.1–1.5 wt %. Coal resids can have a sulfur content of about 0.2–3%. Petroleum gas oils can have a sulfur content of about 0.2–3.5 wt %. Petroleum resids can have a sulfur content of about 0.5–5 wt %.

Irrespective of whether a fixed or expanded bed operation is employedc, hydrotreating conditions according to this invention will vary depending largely on the particular feed employed. Suitable conditions for various feeds are summarized in the following table:

| FEED | PRESSURE (psig) | TEMPERATURE (°F.) | $H_2$ RATE (SCFB) | SPACE VELOCITY (lb/hr/lb Catalyst) |
|---|---|---|---|---|
| GAS OILS | 500–1000 | 600–750 | 800–1600 | 1–4 |
| ATMOSPHERIC RESID | 500–2000 | 600–850 | 500–3000 | 0.5–2 |
| VACUUM RESID | 1000–10,000 | 600–950 | 1000–10,000 | 0.2–3 |

According to a preferred embodiment of the invention, high metals or high metals and high sulfur content feed comprising resid is contacted with hydrogen in the presence of an ebullating bed of the invented catalyst at an average temperature of about 700° to about 900° F., total pressure of about 500 to about 6,000 psig, hydrogen partial pressure of about 500 to about 3,000 psia, hydrogen flow rate or hydrogen addition rate of about 1,000 to about 10,000 SCFB, and LHSV of about 0.2 to about 2.5 volumes of hydrocarbon per hour per volume of catalyst. Preferred operating conditions comprise an average temperature of about 730° to about 810° F., total pressure of about 1,200 to about 3,000 psig, hydrogen partial pressure of about 1,200 to about 2,000 psia, hydrogen flow rate or hydrogen addition rate of about 8,000 SCFB, and LHSV of about 0.4. to about 2.0 volumes of hydrocarbon per hour per volume of catalyst.

EXAMPLES

The catalysts tested in the upcoming examples were synthesized by temperature programmed reaction from their respective oxide precursors. In order to obtain the final product in pellet form the precursor was first pelletized to the desired range of 16 to 20 mesh. It was found that the product retained the parent oxide morphology. Pelletization of the precursor was achieved by treating each of the powder samples with a suitable binder followed by grinding and screening through the sieves. The following compounds were used as binding agents with each of the precursors: tartaric acid, oxalic acid, nitric acid and ammonium hydroxide. Among them, ammonium hydroxide was found to be the most usable binder for $MoO_3$ and $WO_3$.

The process involved grinding the dry powder in a mortar to a very fine size (colloidal range) and then adding the appropriate binding agent in a Pyrex petri dish. In the case of $MoO_3$ and $WO_3$, the amount of ammonia added was just enough to wet the entire mass. Visual inspection showed a local agglomeration proceeding at a moderate rate when insufficient ammonia was added. A slight excess of ammonia was permissible, but larger quantities had to be avoided. The mixture was dried at 135° F. The residue was a solid mass (mudcake) which was knocked out to be subsequently ground and sieved. The $MoO_3$ fines from the sieves were recycled by grinding them to a fine powder and recrystallizing them at 1292° F. for 12 hr.

The reactor used in synthesizing the catalyst was a quartz tube (22 mm I.D. at the reactor bed) provided with a coarse quartz frit to hold the precursor. The reactor was placed in a furnace (Hoskins, 550 W) whose temperature was set by a programmer-controller (Omega Model CN2000). The temperature of the reactor bed was measured using a chromel-alumel thermocouple placed in a thermocouple well located at the center of the bed. The equipment also included an on-line mass-spectrometer (Ametek/Dycor, Model MA100) and a gas chromatograph (Varian, Model 920), both interfaced to a personal computer for data collection and display. These instruments were used only in initial stages with smaller amounts of catalyst precursors to establish conditions for synthesis.

Synthesizing of tungsten carbide consisted of loading about 6 g of the oxide in the reactor, establishing 20% $CH_4/H_2$ gas flows and starting the temperature program. The temperature program consisted of five segments. In the first, the temperature was raised quickly to 737° F. from room temperature. A low reactant gas flow rate, about 1500 $\mu mols^{-1}$, was maintained during this period. In the second segment the temperature was slowly raised up to a maximum of 1,575° F. The reactant flow rate was increased to 2,700 $\mu mols^{-1}$ at the start of this segment. In the third segment, this maximum temperature was maintained for an hour and, in the fourth, the reactor bed was cooled to 1,341° F. In the final segment the reactant flow was switched to pure hydrogen for forty minutes. At the end of this period, the flow was switched to helium and the reaction was quenched by taking the reactor out of the furnace while maintaining helium flow. After the reactor cooled down to room temperature, the catalyst was passivated with a stream of 0.5% $O_2/He$ for an hour and the reactor was left for 12 hr or more in the system with the outlet plugged with glasswool.

The molybdenum carbide catalyst was prepared by loading 6 g of $MoO_3$ into the reactor. The carburizing gas mixture was the same as for the preceding material, with an initial flow rate of 410 $mols^{-1}$ which was later increased to 2,000 $mols^{-1}$ at 716° F. and maintained. The temperature program consisted of three segments. In the first, the temperature was raised quickly from room temperature to 716° F., in the second it was increased slowly to 1,382° F., and in the third this temperature was maintained constant for 30 minutes. The flow was then switched to He and the reactor was taken out of the furnace. Upon cooling to room temperature, it was passivated the same way as described in the preceding WC case.

In the case of supported molybdenum carbide, 6 g of 10% $MoO_3/Al_2O_3$ (a bimodal support known as Amocat 1 B) precursor was charged into the reactor. The temperature program here was similar to the preceding molybdenum carbide case with the maximum temperature now raised to 1,427° F. Other details were same as before.

To prepare molybdenum nitride 4 g of the oxide precursor was reduced and nitrided under pure ammonia flow, with a three-segment temperature ramp similar to the one used for the preparation of molybdenum carbide. A maximum temperature of 1,143° F. for the reactor bed was used. The endotherm associated with ammonia decomposition caused a small temperature difference between the reactor bed and the furnace wall. This drop was taken into account to program the furnace temperature. The flow rates used were about 2,700 $mols^{-1}$ under a pressure of 0.24 MPa.

The supported molybdenum nitride was similar to that of the unsupported sample, except that the maximum temperature for the reactor bed was raised to 1,197° F.

The catalytic samples were characterized by irreversible CO chemisorption at room temperature and physisorption of $N_2$ at liquid nitrogen temperature using a flow adsorption apparatus. The pretreatment generally consisted of reduction of samples in 50% $H_2/He$ at 842° F. for two hours. X-ray diffraction analysis was carried out on passivated samples using a powder diffractometer (Siemens, Model D 500 PC) to check the phase purity of the final products.

EXAMPLE 1

This example demonstrates that bulk $Mo_2N$ and WC are capable of successfully hydrotreating commercial gas oil feedstocks.

Pore size distributions, measured by conventional $N_2$ desorption for $Mo_2N$, WC and Shell-324, are shown in FIG. 1. Note that $Mo_2N$, and WC contain pores significantly smaller than Shell-324. Furthermore, the pore volume of $Mo_2N$ and WC is also markedly lower, as indicated by comparing the total areas under the curves. Pore volumes and surface areas were measured by conventional $N_2$ adsorption techniques and are reported in Table 1. Note the significantly lower values for WC and $Mo_2N$ compared to Shell-324.

$Mo_2N$, WC and Shell-324 were compared for hydrotreating a coal-derived gas oil (boiling point range of 560°-1,000° F.) with properties shown in Table II. The catalysts were compared in flow reactors at 2,000 psig, 700° F., 5 $cm^3/hr$ oil feed rate, and 150 sccm $H_2$ and with weights and corresponding volumes of catalysts shown in Table II. Prior to the run, the Shell-324 and WC and $Mo_2N$ were reduced in flowing $H_2$ at 790° F.

Product properties are also compared in Table II. Note that the nitrogen levels in product and H/C ratios are suprisingly not too different for WC and $Mo_2N$ compared to Shell-324.

TABLE I
COMPARISON OF SURFACE AREAS AND PORE VOLUMES

|  | SHELL-324 | WC | $Mo_2N$ |
|---|---|---|---|
| Pore Volume, $cm^3/g$ | 0.416 | 0.068 | 0.075 |
| Surface Area, $m^2/g$ | 160 | 30 | 96 |

TABLE II
COMPARISON OF CATALYST PERFORMANCES FOR HYDROTREATING COAL GAS OIL[1]

|  | FEED | SHELL-324 | WC | $Mo_2N$ |
|---|---|---|---|---|
| g Catalyst | — | 8.9 | 14.7 | 13.9 |
| $cm^3$ Catalyst | — | 10 | 6 | 10 |
| Carbon, wt % | 89.51 | 89.39 | 89.64 | 89.28 |
| Hydrogen, wt % | 9.74 | 10.41 | 10.2 | 10.17 |
| H/C ratio | 1.31 | 1.40 | 1.37 | 1.37 |
| Nitrogen, ppm | 3820 | 2040 | 2130 | 2260 |
| Sulfur, ppm | 268 | 75 | 231 | 272 |
| Oxygen, wt % | 0.89 | 0.14 | 0.22 | 0.25 |
| Aromaticity, % | 42.3 | 34.1 | 37.5 | 37.6 |

[1]After 72 hours on oil

EXAMPLE 2

This example shows that bulk $Mo_2N$ and WC are capable of successfully hydrotreating commercial resid feedstocks containing a significant amount of sulfur.

The same catalysts described in Example 1 were compared for hydrotreating a blend of 50% panasol (mixture of methylnaphthalenes) and 50% coal residuum. Panasol served as a diluent to make the residuum pumpable. Properties of feedstock are shown in Table III.

Process conditions were 2,000 psig, 760° F., 5 $cm^3/h$ oil feed rate, and 150 sccm $H_2$. Prior to the pilot plant run the catalysts were preconditioned, as described in Example 1.

Table III compares product properties. It is surprising (considering their low pore volume, surface area and pore size) that the $Mo_2N$ and WC are active at all for treating the 1,000+° F. boiling point constituents of the coal residuum. As shown in the table, WC and $Mo_2N$ were active and it is notable that the product resid level is comparable for Shell-324 and WC, indicating similar activities for resid conversion.

TABLE III
COMPARISON OF CATALYST PERFORMANCES FOR HYDROTREATING COAL RESID[1]

|  | FEED | SHELL-324 | WC | $Mo_2N$ |
|---|---|---|---|---|
| g Catalyst | — | 8.9 | 14.7 | 13.9 |
| $cm^3$ Catalyst | — | 10 | 6 | 10 |
| Carbon, wt % | 90.9 | 90.35 | 90.57 | 90.62 |
| Hydrogen, wt % | 7.93 | 9.38 | 8.65 | 8.78 |
| H/C ratio | 1.05 | 1.25 | 1.15 | 1.16 |
| Nitrogen, ppm | 4920 | 2010 | 2810 | 3070 |
| Sulfur, ppm | 800 | 91 | 280 | 229 |
| Oxygen, wt % | 0.73 | 0.17 | 0.39 | 0.39 |
| Aromaticity, % | 69.6 | 51.1 | 61.1 | 59.7 |
| DISTILLATION |  |  |  |  |
| IBP-650F, wt % | 48.9 | 53.0 | 50.9 | 51.1 |
| 650-1,000, wt % | 5.8 | 15.8 | 17.8 | 11.1 |
| 1,000+, wt % | 45.3 | 31.2 | 31.4 | 37.8 |

[1]After 576 hours on oil

EXAMPLE 3

This example demonstrates that the catalytic activity of the active sites of bulk $Mo_2N$ and $Mo_2C/Al_2O_3$ is greater than that of a commercial catalyst, Shell-324-NiMo/$Al_2O_3$, for hydrotreating a coal gas oil at industrial conditions.

The coal derived gas oil described in Example 1 was hydrotreated at the conditions and with the amounts of catalyst shown in Table IV. The pressure and $H_2$ flowrate was the same as for Example 1.

The last two rows give the amount of oxygen atoms chemisorbed by Shell-324 and carbon monoxide molecules (CO) chemisorbed by $Mo_2N$ and $Mo_2C/Al_2O_3$. These quantities are given in micro-moles ($\mu$mol) where one micromole is equal to $6.023 \times 10^{17}$ active sites. That is, the oxygen atoms count the number of active sites in the reactor for Shell-324 and carbon monoxide serves the same role for $Mo_2N$ and $Mo_2C/Al_2O_3$.

Catalytic activities of the active sites for desulfurization, denitrogenation, and aromatic saturation were calculated by dividing the pseudo-first-order rate constants for each of these reactions by the number of active sites given in Table IV. The resulting quantities are shown in Table V relative to Shell-324. Notable is that for each reaction, the active sites of $Mo_2N$ and $Mo_2C/Al_2O_3$ have catalytic activities exceeding that of Shell-324 (NiMo/$Al_2O_3$).

TABLE IV
COMPARISON OF CATALYST PROPERTIES AND PROCESSING CONDITIONS FOR EXAMPLE 3

| CATALYST | $Mo_2N$ | $Mo_2C/Al_2O_3$ | SHELL 324 |
|---|---|---|---|
| $cm^3$ catalyst | 8.4 | 3.4 | 1.2 |
| g Catalyst | 14 | 2.44 | 0.73 |
| $cm^3$ oil/h | 4 | 4 | 4 |
| Temperature, F. | 680 | 680 | 680 |
| mmol Oxygen atoms adsorbed | — | — | 718 |
| mmol CO molecules adsorbed | 714 | 268 | — | a - Measured by adsorption of oxygen ($O_2$) in a static mode.
b - Measured by adsorption of carbon monoxide ($CO_2$) in a static mode.

TABLE V
ESTIMATED RELATIVE CATALYTIC ACTIVITIES PER ACTIVE SITE

| CATALYST | DESULFURIZATION | DENITROGENATION | AROMATIC SATURATION |
|---|---|---|---|
| $Mo_2N$ | 1.3 | 3.4 | 3.4 |
| $Mo_2C/Al_2O_3$ | 2.1 | 5 | 3.1 |
| Shell-324 | 1 | 1 | 1 |

EXAMPLE 4

This example demonstrates that the surfaces of WC and $Mo_2N$ catalysts are not extensively sulfided during use for catalytic hydrotreating.

The fresh catalysts of Example 1 were analyzed by ray photoelectron spectroscopy (XPS) to determine surface compositions. Surface compositions are shown in Table VI.

TABLE VI
SURFACE COMPOSITION (ATOM %) MEASURED BY XPS ON FRESH CATALYST REDUCED IN SITU WITH HYDROGEN AT 790° F. FOR 5 HOURS

|  | Mo | W | C | N | S |
|---|---|---|---|---|---|
| $Mo_2N$ | 24.3 | — | 24.4 | 24.3 | — |
| WC | — | 26.8 | 54.7 | — | — |

XPS was also performed on the catalyst of Example 1 after they had been used as hydrotreating catalysts for 576 hours, at 2,000 psig total pressure, and with both coal gas oil and resid feedstocks. The surface compositions are shown in Table VII. Also shown is the surface composition for Shell-324.

TABLE VII

SURFACE COMOSITION (ATOM %) MEASURED BY XPS ON USED CATALYSTS

|          | Mo   | W    | C    | N   | S   | S/Mo Ratio | S/W ratio |
|----------|------|------|------|-----|-----|------------|-----------|
| Shell-324 | 1.5  | —    | 33.4 | 1.1 | 3.0 | 2.0        | —         |
| Mo$_2$N  | 13.0 | —    | 58.6 | 6.7 | 6.9 | 0.53       | —         |
| WC       | —    | 16.0 | 65.8 | 1.9 | 3.7 | —          | 0.23      |

Notable from Table VII is that the sulfur to molybdenum ratio is two. This is expected because molybdenum disulfide (MoS$_2$) is known to form at the surface of conventional hydrotreating catalysts. In contrast, molybdenum disulfide does not appear to have formed at the surface. This statement is based on the observation (Table VII) that the S/Mo and S/W ratios are significantly less than two. It is concluded that the surface, and therefore catalytic properties, of Mo$_2$N and WC are different from conventional hydrotreating catalysts. Furthermore, the surfaces of Mo$_2$N and WC are not extensively sulfided despite their use to hydrotreat heavy, sulfur-containing, feedstocks at commercial conditions.

That which is claimed is:

1. A hydrotreating process comprising contacting a hydrocarbon feedstock having a boiling point of at least about 460° F. with a catalyst having at least one member selected from the group consisting of a carbide of a Group VIB metal and a nitride of a Group VIB metal at a temperature of at least about 600° F. and total pressure of at least about 500 psig.

2. A process of claim 1 wherein said hydrocarbon feedstock comprises a gas oil having a boiling point of about 650°-1,000° F.

3. A process of claim 1 wherein said feedstock comprises a hydrocarbon residuum having a boiling point of at least about 1,000° F.

4. A process of claim 1 wherein said feedstock has a sulfur concentration of at least about 1,000 ppm by weight.

5. A process of claim 4 wherein said feedstock has a sulfur concentration greater than about 1 wt %.

6. A process of claim 1 wherein said feedstock has a sulfur concentration of greater than about 3 wt %.

7. A process of claim 1 wherein said hydrocarbon feedstock comprises a substantial amount of polycyclic aromatics.

8. A process of claim 1 wherein said Group VIB metal has at least one member selected from the group consisting of Cr, Mo, and W.

9. A process of claim 8 wherein said catalyst comprises Mo$_2$C.

10. A process of claim 8 wherein said catalyst comprises WC.

11. A process of claim 8 wherein said catalyst comprises Mo$_2$N.

12. A process of claim 1 wherein said Group VIB metal is deposited on an inorganic oxide support.

13. A process of claim 12 wherein said support is alumina.

14. A hydrotreating process comprising contacting a hydrocarbon feedstock having a boiling point of at least about 650° F. and a sulfur concentration of at least about 1,000 ppm by weight with a catalyst having at least one member selected from the group consisting of a carbide of a Group VIB metal and a nitride of a Group VIB metal at a temperature of at least about 600° F. and a total pressure of at least about 500 psig.

15. A process of claim 14 wherein said hydrocarbon feedstock comprises a gas oil having a boiling point of about 650°-1,000° F.

16. A process of claim 14 wherein said feedstock has a sulfur concentration greater than about 1,000 ppm by weight.

17. A process of claim 14 wherein concentration is greater than about 1 wt %.

18. A process of claim 14 wherein said Group VIB metal has at least one member selected from the group consisting of Cr, Mo, and W.

19. A process of claim 18 wherein said catalyst comprises Mo$_2$C.

20. A process of claim 17 wherein said catalyst comprises WC.

21. A process of claim 18 wherein said catalyst comprises Mo$_2$C.

22. A process of claim 14 wherein said Group VIB metal is deposited on an inorganic oxide support.

23. A process of claim 20 wherein said support is alumina.

24. A process of claim 14 wherein said hydrocarbon feedstock comprises a substantial amount of polycyclic aromatics.

25. A hydrotreating process comprising contacting a hydrocarbon feedstock having a boiling point of at least about 1000° F. and a sulfur content of at least about 1% by weight at a temperature of at least about 600° F. and a total pressure of at least about 500 psig with a catalyst having at least one member selected from the group consisting of Mo$_2$C, Mo$_2$N, and WC.

26. A process of claim 25 wherein said sulfur concentration is at least about 3 wt %.

27. A process of claim 25 wherein said hydrocarbon feedstock comprises a substantial amount of polycylic aromatic.

* * * * *